(12) United States Patent
Hansen et al.

(10) Patent No.: US 9,266,554 B2
(45) Date of Patent: Feb. 23, 2016

(54) STEERING COLUMN FOR A MOTOR VEHICLE

(71) Applicant: Daimler AG, Stuttgart (DE)

(72) Inventors: Detlef Hansen, Schenefeld (DE); Torsten Harms, Hamburg (DE); Axel Hebenstreit, Stuttgart (DE); Holger Kittler, Hamburg (DE); Jan Maak, Seevetal (DE); Juergen Niemoeller, Sindelfingen (DE); Steffen Schulze, Stuttgart (DE); Marco Schwieger, Hamburg (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/397,242

(22) PCT Filed: Feb. 5, 2013

(86) PCT No.: PCT/EP2013/000343
§ 371 (c)(1),
(2) Date: Oct. 27, 2014

(87) PCT Pub. No.: WO2013/159846
PCT Pub. Date: Oct. 31, 2013

(65) Prior Publication Data
US 2015/0076804 A1 Mar. 19, 2015

(30) Foreign Application Priority Data
Apr. 28, 2012 (DE) .......... 10 2012 008 836

(51) Int. Cl.
*B62D 1/184* (2006.01)
*B62D 1/185* (2006.01)
*B62D 1/19* (2006.01)

(52) U.S. Cl.
CPC ........... *B62D 1/184* (2013.01); *B62D 1/185* (2013.01); *B62D 1/19* (2013.01)

(58) Field of Classification Search
CPC .......... B62D 1/184; B62D 1/185; B62D 1/19
See application file for complete search history.

(56) References Cited

U.S. PATENT DOCUMENTS 7,726,691 B2 * 6/2010 Yamada .................. 280/775
8,550,497 B2 * 10/2013 Takezawa et al. ....... 280/775
(Continued)

FOREIGN PATENT DOCUMENTS

| DE | 197 07 067 C1 | 6/1998 |
| DE | 103 43 685 A1 | 4/2005 |
| DE | 10 2010 051 880 A1 | 5/2011 |

OTHER PUBLICATIONS

International Search Report (PCT/ISA/210) dated May 8, 2013, with English translation (four (4) pages).
(Continued)

*Primary Examiner* — Drew Brown
(74) *Attorney, Agent, or Firm* — Crowell & Moring LLP

(57) ABSTRACT

A motor vehicle steering column includes an inner jacket pipe that receives a steering spindle, which is received in a longitudinally adjustable manner in an outer jacket pipe held on a steering console and having a hollow cross-section. The steering column also includes a clamping device, by means of which the inner jacket pipe can be releasably secured in its adjusted longitudinal position relative to the outer jacket pipe. The outer jacket pipe has a recess at least over a longitudinal region, whereby its hollow cross-section can be altered by the clamping device.

8 Claims, 4 Drawing Sheets

(56) References Cited

U.S. PATENT DOCUMENTS

Figure 1:
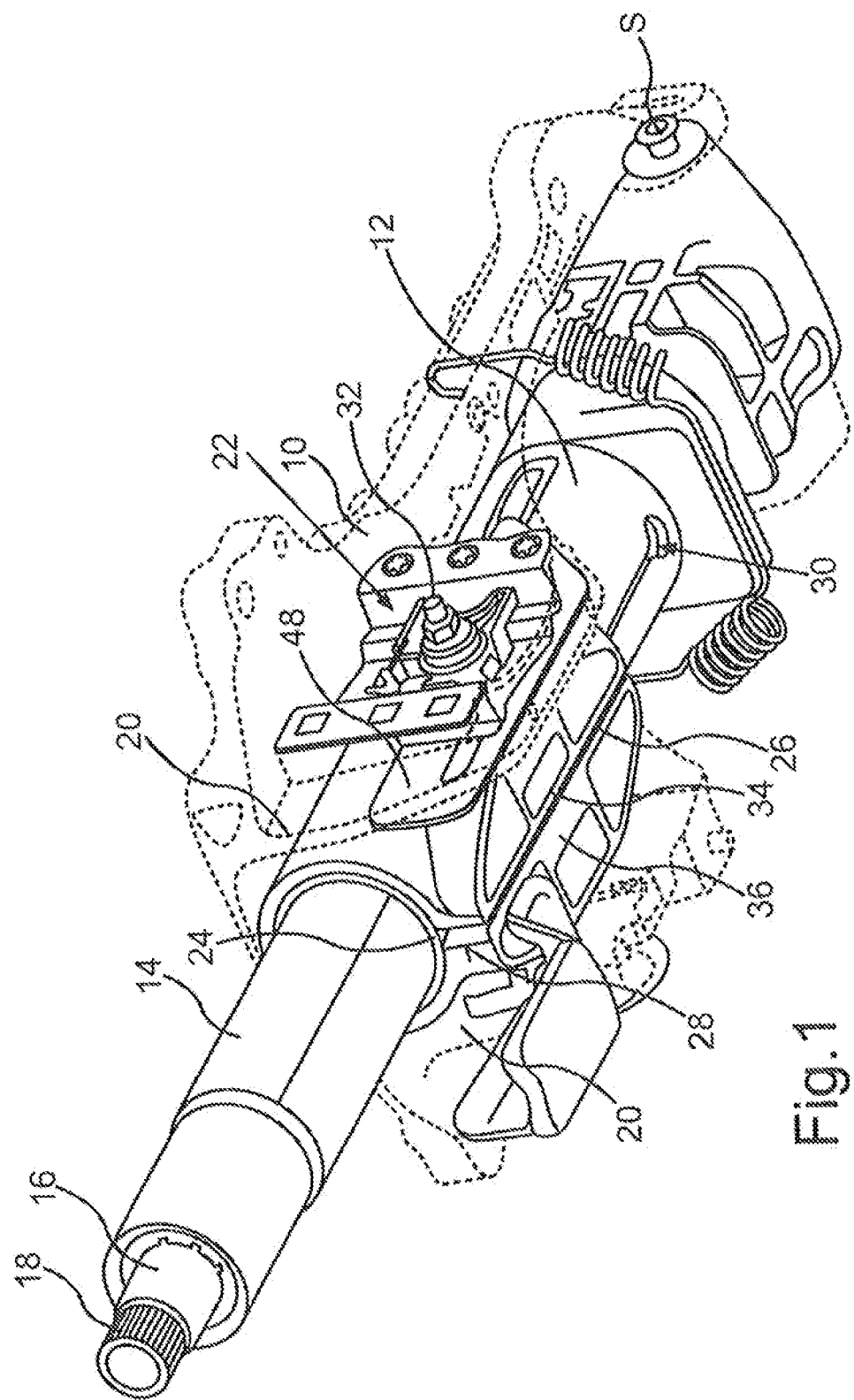

| | | | |
|---|---|---|---|
| 8,967,017 B2* | 3/2015 | Osawa et al. | 74/495 |
| 8,984,983 B2* | 3/2015 | Hansen et al. | 74/493 |
| 8,984,984 B2* | 3/2015 | Yokota et al. | 74/493 |
| 2001/0019205 A1* | 9/2001 | Ikeda et al. | 280/775 |
| 2003/0000330 A1* | 1/2003 | Murakami et al. | 74/492 |
| 2006/0028010 A1 | 2/2006 | Yamada | |
| 2007/0137378 A1 | 6/2007 | Bastein et al. | |
| 2011/0006510 A1* | 1/2011 | Bastein et al. | 280/779 |
| 2012/0266714 A1 | 10/2012 | Hansen et al. | |

OTHER PUBLICATIONS

German-language Written Opinion (PCT/ISA/237) dated May 8, 2013 (five (5) pages).

* cited by examiner

STEERING COLUMN FOR A MOTOR VEHICLE

BACKGROUND AND SUMMARY OF THE INVENTION

Exemplary embodiments of the invention relate to a longitudinally adjustable steering column for a motor vehicle, in particular a passenger motor vehicle.

German patent document DE 10 2010 051 880 A1 discloses a longitudinally adjustable steering column in which an inner jacket pipe of the steering column, which receives a steering spindle, is received in a longitudinally adjustable manner in an outer jacket pipe, which for its part is held in a height-adjustable manner on a steering console fastened on a shell side of the motor vehicle. The steering column furthermore comprises a clamping device, by means of which the inner jacket pipe can be secured releasably in its adjusted longitudinal position relative to the outer jacket pipe.

In order to guarantee a comfortable adjustment in such mechanically adjustable steering columns the adjustment force that is to be applied manually must be as low as possible in the released state of the clamping device, i.e., when the inner jacket pipe is released in its movement relative to the outer jacket pipe. On the other hand when the clamping device is in the locked state it is necessary for the required sliding seat between the inner and the outer jacket pipe to be as rigid as possible for a high level of rigidity or resonant frequency of the steering column. There thus arises a technical conflict between an adjustment of the inner to the outer jacket pipe, which is as smooth as possible, for a released clamping device on the one hand, and a securing of the inner jacket pipe relative to the outer jacket pipe, which is as rigid as possible, for a locked clamping device.

This problem is further intensified by the requirement that the steering column be designed with both jacket pipes for the absorption of impact energy caused by an accident, and also that only a limited amount of space be available. Especially in this case, hitherto existing solutions in which, for example, plastic injection is provided between both jacket pipes for tolerance compensation, which is disclosed, for example, in German patent document DE 103 43 685 A1, are not suitable.

Finally, German patent document DE 197 07 067 C1 discloses a steering column unit for a motor vehicle in which a jacket pipe is used that has a groove slot. This groove slot prevents torsion, such that the jacket pipe can be fixed with positional accuracy at a fastening point on sides of a steering console.

Exemplary embodiments of the present invention are directed to an adjustable steering column in which the inner jacket pipe is smoothly longitudinally adjustable relative to the outer jacket pipe and can be rigidly secured.

In order to create a steering column of the type cited at the start with an inner jacket pipe, which on the one hand can be adjusted smoothly for longitudinal adjustment relative to the outer jacket pipe, and which on the other hand can be secured particularly rigidly to the outer jacket part to guarantee a high level of rigidity or resonant frequency of the steering column, according to the invention the outer jacket pipe has at least one recess above a longitudinal region, whereby its hollow cross-section can be altered by means of the clamping device. In other words, according to the invention the hollow cross-section of the outer jacket pipe, at least over a partial length, includes a recess, for example in the form of a longitudinal slot, such that its hollow cross-section can be enlarged or reduced in a simple manner by means of the clamping device, according to whether the inner jacket pipe is to have its length adjusted or is to be fixed.

By providing such a recess, a correspondingly widened hollow cross-section of the outer jacket pipe can thus on the one hand be achieved—in the case of a released clamping device—such that the inner jacket pipe can be smoothly axially displaced relative to the outer jacket pipe. On the other hand, the hollow cross-section can be reduced in size in a simple manner by means of the clamping device in such a way that as reliable and fixed a securing as possible of the inner jacket pipe arises in its adjusted longitudinal position relative to the outer jacket pipe. Thus, overall, a steering column with high rigidity and resonant frequency can be obtained.

A further advantageous embodiment provides that the recess is formed to be open towards a steering wheel side of the outer jacket pipe. With such a recess of the outer jacket pipe, its hollow cross-section can be varied in diameter in a particularly simple manner by means of the clamping device, such that a particularly expedient longitudinal adjustment can be achieved and as rigid a securing as possible of the inner jacket pipe relative to the outer jacket pipe can be achieved.

Here, it has been shown to be advantageous in a further embodiment of the invention if the recess is at least substantially formed as a slot running in the axial direction of the outer jacket pipe. Such a slot can be produced particularly simply in terms of manufacturing technology.

Is it furthermore advantageous for the clamping device to comprise a clamping wedge device. Such a clamping wedge device enables a particularly reliable securing of the inner jacket pipe relative to the outer jacket pipe, in particular if the steering column is to be able to be used for the absorption of impact energy.

In a further advantageous embodiment a force element, in particular a clamping plate, is provided between a clamping element of the clamping device and the outer jacket pipe. The advantage of such a clamping plate or such a force transmission element is that this can have, in a simple manner, an enlarged clamping face, such that, during clamping, corresponding clamping forces can be transferred to the outer jacket pipe.

Here, it has been shown to be advantageous in a further embodiment of the invention if the force transmission element is coupled for movement with the inner jacket pipe via a driver connection pushing through the outer jacket pipe. With this driver connection, the force transmission element, in particular the clamping plate, is picked up by the inner jacket pipe if the inner jacket pipe is adjusted relative to the outer jacket pipe or, in the case of an application of force caused by an accident, the inner jacket pipe is pushed in a telescopic manner into the outer jacket pipe. Here, the driver connection is preferably designed to be positive and/or firmly bonded, since a particularly reliable connection between the force transmission element and the inner jacket pipe is to be hereby achieved.

In a further advantageous embodiment a longitudinal hole is hollowed out of the outer jacket pipe for the driver connection. Here, this longitudinal hole can, for example, be designed in such a way that it serves as a guide for the driver connection.

In a further advantageous embodiment, at least one friction-increasing element is allocated to the clamping device. This can be a corresponding friction film, which, for example, is arranged between a clamping element of the clamping device and the outer jacket pipe or the force transmission element. Alternatively, a coating or suchlike would also be conceivable. On the one hand, a particularly secure fixing of the inner jacket pipe relative to the outer jacket pipe can hereby be achieved and, on the other hand, the accident force, which may potentially be absorbed by the steering column, is increased.

Finally, it has been shown to be advantageous if the outer jacket pipe is held on the steering console in a height-adjustable manner. There hereby arises a steering column that can be adjusted in all major directions having the advantages described above.

BRIEF DESCRIPTION OF THE DRAWING FIGURES

Figure 2:
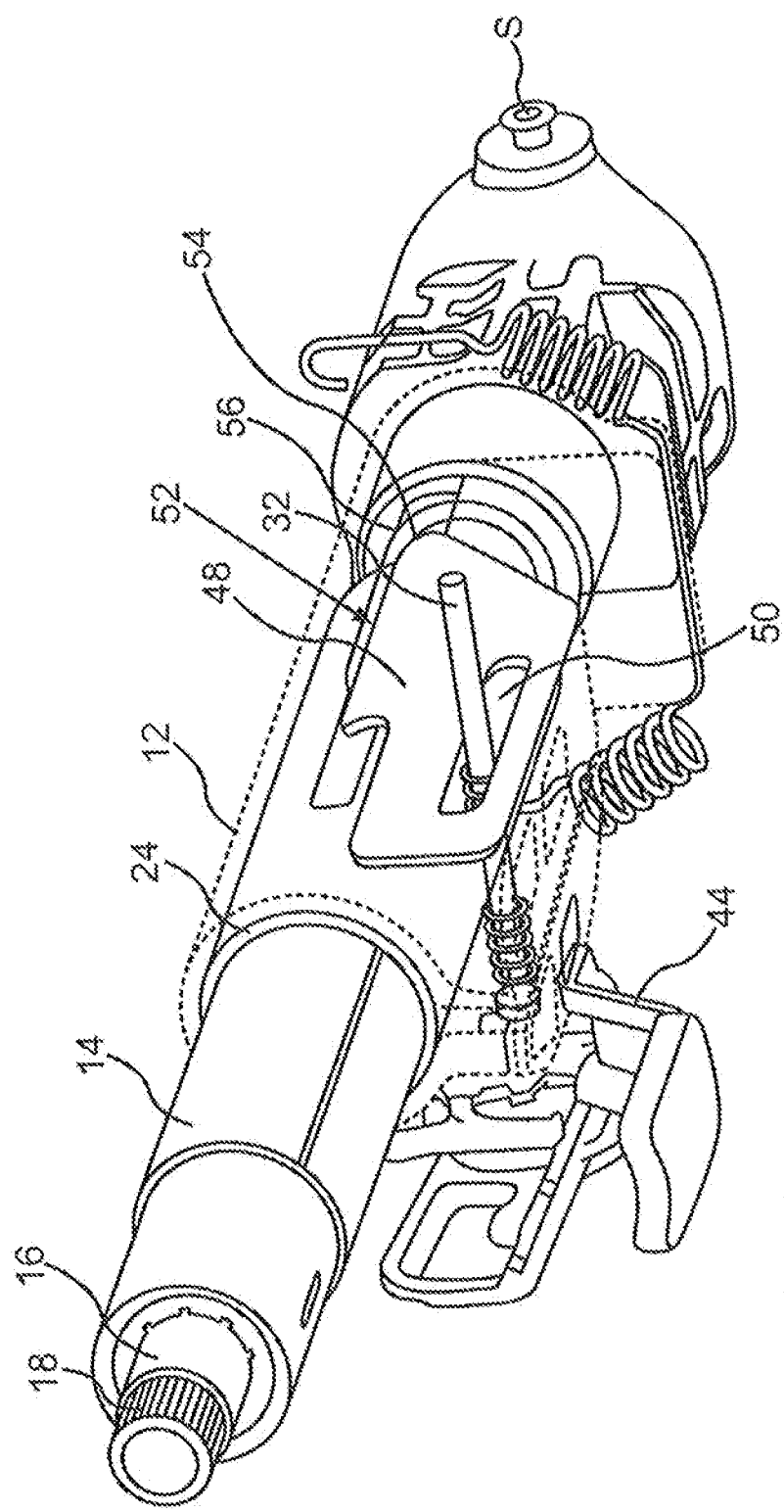
Figure 3:
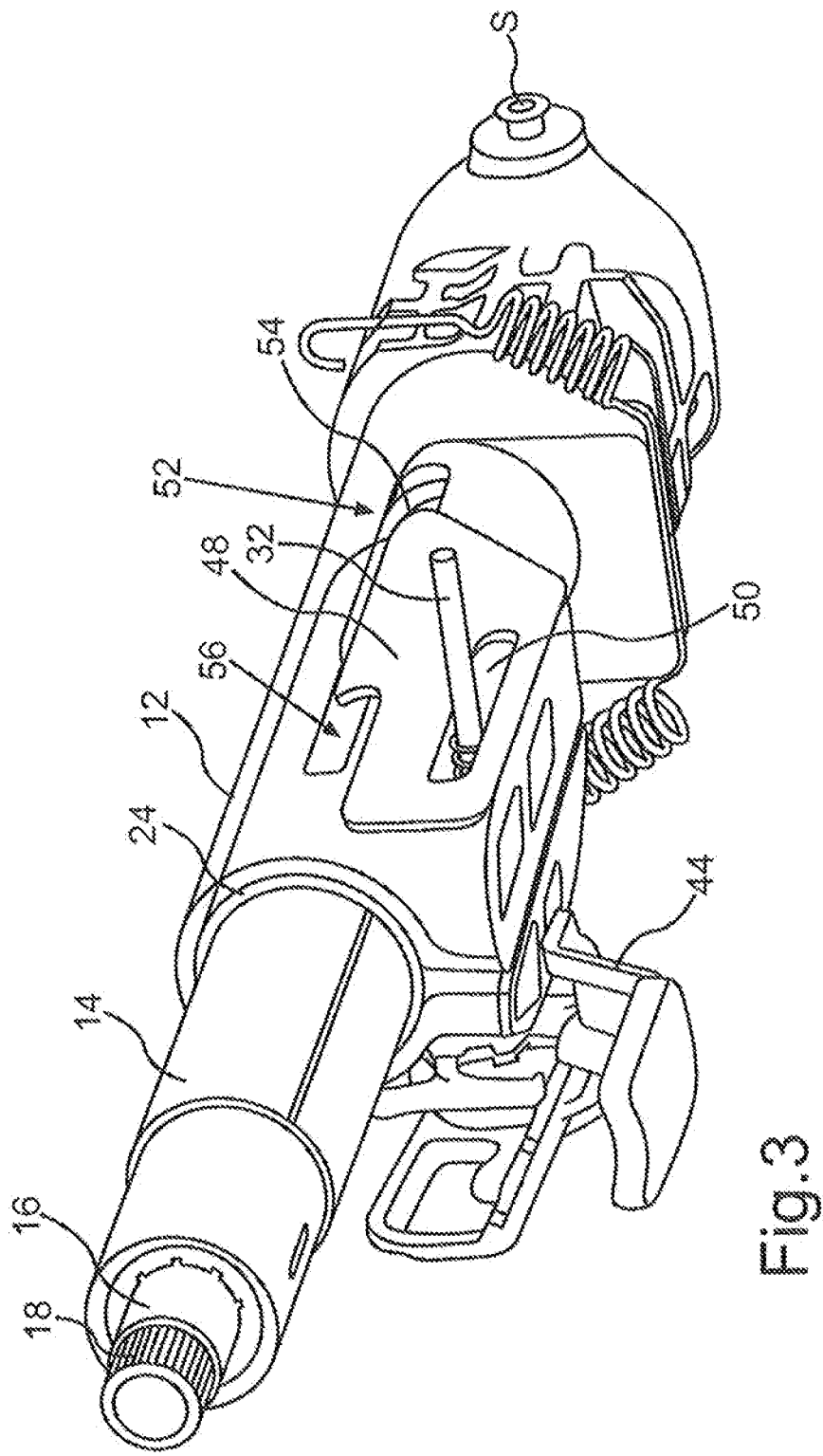
Figure 4:
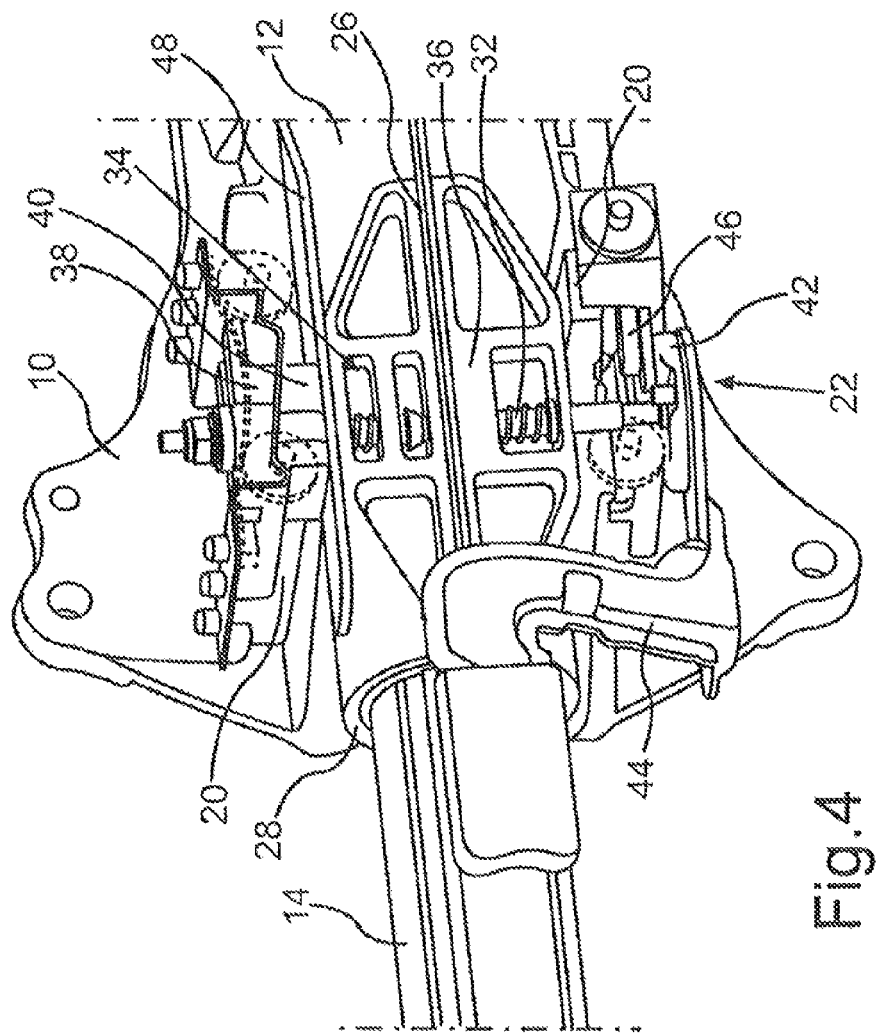

Further advantages, features and details of the invention arise from the following description of a preferred exemplary embodiment and by reference to the drawings; the following are shown:

FIG. 1 a perspective view from diagonally below of a steering column for a motor vehicle having an inner jacket pipe that receives a steering spindle, the pipe being received in a longitudinally adjustable manner in an outer jacket pipe that is held on the shell side on a fixable steering console and has a hollow cross-section, and having a clamping device, by means of which the inner jacket pipe can be secured in its adjusted longitudinal position relative to the outer jacket pipe, wherein the outer jacket pipe has a recess in the form of a slot running in the axial direction on the underside above a substantial longitudinal region, said slot being designed to be open towards the steering wheel side of the outer jacket pipe, whereby the hollow cross-section of the outer jacket pipe can be altered by means of the clamping device;

FIG. 2 a perspective view from below of the steering column according to FIG. 1 with the steering console and clamping device left out, as well as with the outer jacket pipe being depicted as cut in the axial direction;

FIG. 3 a perspective view from below of the steering column analogously to FIG. 2 with the steering console and clamping device left out; and FIG. 4 a sectional and slightly perspective view from below of the steering console according to FIGS. 1 to 3.

DETAILED DESCRIPTION

In FIG. 1 a steering column for a motor vehicle, which is configured as a passenger motor vehicle in the present instance, is depicted in a perspective view diagonally down and forward. The steering column comprises a steering console 10, which can be secured on the body side, for example in the region of a corresponding cross-member. On the steering console 10, an outer jacket pipe 12 for height adjustment or inclination adjustment is held for rotation around an axis of rotation S, the pipe having substantially one tubular hollow cross-section and longitudinally adjustably receiving an inner jacket pipe 14 in a manner that is described in greater detail below. In turn, a steering spindle 16 is received for rotation within the inner jacket pipe 14, the spindle having a corresponding toothing system 18 on its end facing towards the vehicle driver, on which toothing system the steering wheel of the steering column can be fixed.

To hold the steering column, the steering console 10 has respective, downwardly-protruding bearing limbs 20 on its side facing away from the axis of rotation S or facing towards the steering wheel, between which limbs both jacket pipes 12, 14 or the steering spindle 16 are guided. In the region of these bearing limbs 20, both jacket pipes 12, 14 or the steering spindle 16 can be secured relative to the steering console 10 or relative to each other in a corresponding manner by means of a clamping device 22, the basic structure and functionality of which are disclosed in German patent document DE 10 2010 051 880 A1, the disclosure of which in this respect is to be considered as explicitly included.

As can be seen in FIGS. 2 and 3, the hollow cross-section of the outer jacket pipe 12 has an inner diameter that is at least substantially coordinated with an outer diameter of the inner jacket pipe 14. Here, if necessary—as is provided in the present instance—another distance pipe element 24 or suchlike can be provided between the inner jacket pipe 14 and the outer jacket pipe 12.

Furthermore, it can be seen from FIG. 4, which shows a sectional view from below of the steering column according to the previous figures, as well as with the aid of FIG. 1, that the outer jacket pipe 14 has a recess 26 in the form of a slot over a substantial longitudinal region, which extends in the axial direction of the jacket pipe 12, 14 or the steering column 10. Here, this recess 26 is formed to be open towards a steering wheel side 28 of the outer jacket pipe 12. On the opposite end, the recess 26 has an approximately circular enlargement 30 in its cross section.

It can be achieved by the recess 26 that the hollow cross-section of the outer jacket pipe 12 can be altered by means of the clamping device 22. If, as a consequence, the clamping device 22 is released in a manner that is described in greater detail below, the inner jacket pipe 14 having the steering spindle 16 can be longitudinally adjusted in an axially moveable manner relative to the outer jacket pipe 12 or to the steering console 10. If, however, the clamping device 22 is located in its clamping position in a manner that is described in greater detail below, the hollow cross-section of the outer jacket pipe 12 or the recess 26 is reduced in size in such a way that the inner jacket pipe 14 is hereby fixed accordingly with the distance pipe element 24 that encloses this relative to the outer jacket pipe 12.

Due to the recess 26 in the form of the gap, the longitudinal adjustment of the inner jacket pipe 14 relative to the outer jacket pipe 12 can be carried out after the release of the clamping device 22 particularly smoothly without the clamping effect in the clamping position being negatively influenced accordingly. In fact, it is achieved that, when unlocking the clamping device 22 by spring-back of the outer jacket pipe 12, whereby the recess 26 is correspondingly enlarged in terms of its width, an increased amount of clearance relative to the inner jacket pipe 14 is produced, such that this can be displaced very easily in the outer jacket pipe 12.

In the locked state of the clamping device 22, the width of the recess 26 is, however, reduced as a result of the exerted clamping force in such a way that the clearance is removed and the arresting adjustment between both jacket pipes 12, 14 or jacket pipe parts takes place.

The clamping device 22 comprises a clamping bolt 32, which pushes through respective outer jacket pipe regions 34, 36 that border the recess 26. Here, a pair of clamping wedges 38, 40 of a clamping wedge device is provided on one end of the clamping bolt 32, the wedges being held on the respective corresponding bearing limbs 20 of the steering console 10. On the side opposite the clamping wedges 38, 40, the clamping device 26 has a cam disc 42 that is connected to an actuation lever 44. Here, the cam disc 42 interacts with a fixed cam disc 46, which is supported on the corresponding bearing limb 20 of the steering console 10. By swiveling the actuation lever 44 downwards or upwards accordingly, the cam disc 42 thus rotates relative to the cam disc 46, whereby an axial distance between the cam disc 46 and the clamping wedges 38, 40 is enlarged or reduced accordingly. In other words, the clamping wedges 38, 40 can be adjusted transversely to the longitudinal extension of the jacket pipes 12, 14.

Since the clamping wedge 40 is in indirect contact with the corresponding outer jacket pipe region 34 of the outer jacket pipe 12 under the influence of a force transmission element 48 that is still to be illustrated in greater detail below, an actuation of the actuation lever 44 accordingly causes a change in the width of the recess 26 or of the distance between both outer jacket pipe regions 34, 36, and thus a clamping or release of the inner jacket pipe 14 with respect to the outer jacket pipe 12.

The force transmission element 48, which is provided between the corresponding clamping element in the form of the clamping wedge 40 and the outer jacket pipe 12 or the jacket pipe region 34 thereof, is presently designed as a clamping plate. In contrast to a direct attachment of the clamping wedge 40 to the outer jacket pipe region 34, which would also be conceivable, the use of such a force transmission element 48 has the advantage that an increased frictional force between the clamping device 22 and the outer jacket pipe 12 can potentially be provided.

If an embodiment without a force transmission element 48 is selected, the clamping wedge 40—without the force transmission element 48—rests directly on the outer jacket pipe 12 with a flat side and, with the wedge-shaped side lying opposite, on a counter-wedge body or clamping wedge 38 that can be adjusted transversely to the longitudinal extension of the jacket pipe 38, 40 by means of an actuation lever 44, and is in a driver connection with the inner jacket pipe 14.

The use of the force transmission element 48 is particularly advantageous if the steering column is used for the absorption of impact energy. In the case of an introduction of force caused by an accident, and a relative movement of the jacket pipes 12, 14, then the clamping wedge 40 does not grind along the outer jacket pipe 12, but rather along the force transmission element 48, whereby the introduced accident energy is introduced into the clamping device 22 via this and is dissipated by means of the influence of the clamping wedge. In this instance, the introduced accident energy passes into the steering console 10 and from there into the cross-member or the motor vehicle body. Here, the force transmission element 48 has been shown in particular to be advantageous if a magnesium die casting alloy is provided as material for the outer jacket pipe 12. An increased level of friction can hereby be provided.

The force transmission element 48 itself is, in the present instance, formed from a steel alloy and comprises an axial longitudinal hole 50, which is passed through by the clamping bolt 32 of the clamping device. Here, it can be detected that the force transmission element 48 has an enlarged area compared to the corresponding contact surface of the corresponding outer jacket pipe region 34, such that, during a clamping of the clamping device 22, higher clamping forces, which act via the respective clamping wedge 34, 36, are transferred and distributed to the outer jacket pipe 12.

In particular, it can furthermore be detected from FIGS. 2 and 3 that the force transmission element 48 is coupled for movement with the inner jacket pipe 14 via a driver connection 52 that passes through the outer jacket pipe 12. For the production of this driver connection 52, the force transmission element 48 has a gripper ledge 54 on the underside in the form of the clamping plate, which extrudes inwardly downwards and is in contact with the inner jacket pipe 12 through an axial longitudinal hole 56 within the outer jacket pipe 12. The driver connection 52 between the inner jacket pipe 14 and the force transmission element 48 is, in this instance, preferably designed to be positive and/or firmly bonded. When decoupling the corresponding clamping wedge 40 from the outer jacket 12, in order to hereby prevent a direct attachment to this, the clamping wedge 40 can, on the one hand, be designed very simply and, on the other hand, due to the diversion via the force transmission element 48, can safeguard its function for both the dissipation of accident energy and for arresting the longitudinal adjustment of the inner jacket pipe 14 or the steering column as a whole.

In the case of such an application of force caused by an accident, the inner jacket pipe 14 is displaced accordingly by driving the force transmission element 48, whereby corresponding friction between the allocated clamping part 40, which is positioned axially tightly on the outer jacket pipe 12, and the force transmission element 48, arises. Here, in a preferred manner, a friction-increasing element, for example a friction film or a corresponding coating that activates the desired level of friction, is provided between the clamping wedge 40 and the force transmission element 48. Here, this friction-increasing element can be provided both on the clamping wedge 40 and on the force transmission element 48, so on other points of the clamping device 22 as well.

Overall, it can thus be seen that the outer jacket pipe 12 can have its hollow cross-section enlarged by the recess 26 during the release of the clamping device 22 in such a way that low longitudinal adjustment forces arise in the unlocked state. At the same time, the hollow cross-section of the outer jacket pipe 12 can be reduced by the clamping device 22 as a result of the provision of the recess 26 in such a way that an optical securing of the inner jacket pipe 14 relative to the outer jacket pipe can be implemented. A high level of rigidity and resonant frequency of the steering column can hereby be achieved. A further advantage consists in that no additional tolerance compensation between both jacket pipes 12, 14 is mandatorily required. This additionally causes low process fluctuations during assembly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motor vehicle steering column, comprising:
a steering spindle;
an inner jacket pipe that receives the steering spindle;
an outer jacket pipe that receives the inner jacket pipe in a longitudinally adjustable manner in the outer jacket pipe, wherein the outer jacket pipe is held on a steering console and has a hollow cross-section;
a clamping device configured to releasably secure the inner jacket pipe in an adjusted longitudinal position relative to the outer jacket pipe,
wherein the outer jacket pipe has a recess, at least over a longitudinal region, which allows the hollow cross-section of the outer pipe to be altered by the clamping device; and
a clamping plate arranged between a clamping element of the clamping device and the outer jacket pipe,
wherein the clamping plate is coupled for movement with the inner jacket pipe via a driver connection that pushes through the outer jacket pipe.

2. The steering column of claim 1, wherein the recess is open towards a steering wheel side of the outer jacket pipe.

3. The steering column of claim 1, wherein the recess is a slot running in the axial direction of the outer jacket pipe.

4. The steering column of claim 1, wherein the clamping device comprises a wedge clamping device.

5. The steering column of claim 1, wherein the clamping plate is connected positively or firmly bonded to the inner jacket pipe via the driver connection.

6. The steering column of claim 1, further comprising:
a longitudinal hole for the driver connection is hollowed out of the outer jacket pipe.

7. The steering column of claim 1, further comprising:
at least one friction-increasing element allocated to the clamping device.

8. The steering column of claim 1, wherein the outer jacket pipe is held on the steering console in a height-adjustable manner.

* * * * *